United States Patent
Usami et al.

(10) Patent No.: US 6,984,433 B2
(45) Date of Patent: Jan. 10, 2006

(54) OPTICAL RECORDING MEDIUM AND METHOD OF PRODUCING THE SAME

(75) Inventors: Mamoru Usami, Tokyo (JP); Takeshi Umega, Tokyo (JP); Hiroshi Kobayashi, Tokyo (JP); Kazuki Suzawa, Tokyo (JP)

(73) Assignee: TDK Corporation, Tokyo (JP)

( * ) Notice: Subject to any disclaimer, the term of this patent is extended or adjusted under 35 U.S.C. 154(b) by 8 days.

(21) Appl. No.: 10/897,006

(22) Filed: Jul. 23, 2004

(65) Prior Publication Data

US 2005/0053749 A1 Mar. 10, 2005

(30) Foreign Application Priority Data

Jul. 25, 2003 (JP) .............................. 2003-280417
Jul. 25, 2003 (JP) .............................. 2003-280418

(51) Int. Cl.
*B32B 3/02* (2006.01)
(52) U.S. Cl. ............... 428/64.1; 428/64.4; 430/270.12; 430/270.13
(58) Field of Classification Search ............... 428/64.1, 428/64.4; 430/270.12, 270.13

See application file for complete search history.

(56) References Cited

U.S. PATENT DOCUMENTS

| | | | | |
|---|---|---|---|---|
| 5,972,457 A | * | 10/1999 | Matsuishi et al. | 428/64.1 |
| 2002/0001285 A1 | * | 1/2002 | Takeshima et al. | 369/290 |
| 2003/0031954 A1 | * | 2/2003 | Kakuta et al. | 430/270.2 |
| 2003/0067864 A1 | * | 4/2003 | Kikuchi et al. | 369/283 |
| 2005/0079299 A1 | * | 4/2005 | Matsubaguchi et al. | 428/32.31 |

FOREIGN PATENT DOCUMENTS

| | | |
|---|---|---|
| JP | 11-162808 | 6/1999 |
| JP | 2000-167476 | 6/2000 |
| JP | 2002-237103 | 8/2002 |

* cited by examiner

*Primary Examiner*—Elizabeth Mulvaeny
(74) *Attorney, Agent, or Firm*—Oblon, Spivak, McClelland, Maier & Neustadt, P.C.

(57) ABSTRACT

An optical recording medium 10 comprises a disc body 11, a white ink layer 12 provided on the label side 11b of the disc body 11, and an ink receiving layer 13 provided on the surface 12a of the white ink layer 12. The mean roughness (Ra) of the surface 12a of the white ink layer 12 is set not greater than 0.2 $\mu$m. A step radially extended is left on the surface 13a of the ink receiving layer 13 and set not greater than 1.0 $\mu$m. As the mean roughness (Ra) of the surface 12a of the white ink layer 12 is not greater than 0.2 $\mu$m or as the step on the ink receiving layer 13 is not greater than 1.0 $\mu$m, high printing quality can be secured when printing is done with an ink-jet printer.

11 Claims, 4 Drawing Sheets though data are usable for preserving digital data such as image data and musical data having larger files simply at low cost, they have become utilized by a great deal of users. With the diffusion of optical recording media of the type mentioned above, there has increasingly developed a demand for making original optical recording media by having data printed on label sides opposite to light incident sides with printers and optical recording media capable of satisfying such a demand have already been developed and marketed.

OPTICAL RECORDING MEDIUM AND METHOD OF PRODUCING THE SAME

BACKGROUND OF THE INVENTION

The present invention relates generally to optical recording media and a method of producing the same, and more particularly, to an optical recording medium capable of having data printed on a label side opposite to a light incident side and a method of producing the same.

As recording media for recording large digital data, optical recording media represented by CDs (Compact Discs) and DVDs (Digital Versatile Discs) have widely been used and particularly optical recording media of such a type that data can be recorded by users are rapidly diffusing in recent years. As optical recording media capable of recording data are usable for preserving digital data such as image data and musical data having larger files simply at low cost, they have become utilized by a great deal of users. With the diffusion of optical recording media of the type mentioned above, there has increasingly developed a demand for making original optical recording media by having data printed on label sides opposite to light incident sides with printers and optical recording media capable of satisfying such a demand have already been developed and marketed.

An ink receiving layer for fixing ink is provided on the label side of an optical recording medium, so that printing can be done on the label side by using an ink-jet printer for supplying ink to the ink receiving layer.

However, printing quality for the optical recording medium is generally lower than what is for glossy paper and the problem is that the performance of the ink-jet printer capable of high-quality printing cannot be brought out satisfactorily. In order to solve this problem, there has been proposed an optical recording medium by JP-A-2002-237103 in which the surface roughness of an ink receiving layer is restrained from exceeding a predetermined value.

Although it is considered desirable to form such an ink receiving layer by using a spin coating method to reduce the surface roughness of the ink receiving layer, the surface roughness of the ink receiving layer thus formed is not always reducible even when an application liquid for making obtainable a flat smooth surface is selected because the surface roughness of the ink receiving layer is affected by the undercoat thereof and the problem is that high printing quality remains unavailable in this case.

Consequently, it has been not necessarily easy to reduce the surface roughness even in case that the ink receiving layer is formed by using the spin coating method.

On the other hand, there is a slit coating method known as a coating method capable of forming a coating film having a flat smooth surface and normally used for a rectangular shaped object (e.g., display panel) to be processed (refer to JP-A-11-162808 and JP-A-2000-167476). When the slit coating method is employed for disc-shaped objects to be processed like general optical recording media, the coating method brings with it a number of difficulties including causing a great step (difference in level) at the joint portion.

With the great step existing on the ink receiving layer, the step becomes conspicuous when printing is done with a printer, which poses a serious problem in that printing quality is deteriorated.

SUMMARY OF THE INVENTION

It is therefore an object of the invention to provide an optical recording medium wherein it is ensured that the surface roughness of an ink receiving layer is reduced whereby to make high-quality printing feasible, and a method of producing the same. It is another object of the invention to provide an optical recording medium wherein it is ensured that a step (difference in level) formed on the surface of an ink receiving layer is reduced whereby to make high-quality printing feasible, and a method of producing the same.

An optical recording medium, according to a first aspect of the invention, includes a disc body, an ink receiving layer provided on the label side of the disc body, and an undercoat layer provided between the label side of the disc body and the ink receiving layer, wherein the mean roughness (Ra) of the surface of the undercoat layer is not greater than 0.2 $\mu$m. Since the mean roughness (Ra) of the surface of the undercoat layer placed beneath the ink receiving layer is not greater than 0.2 $\mu$m according to the invention, it is ensured that the surface roughness of the ink receiving layer formed on the surface of the undercoat layer is reduced. Consequently, color development and gloss close to those of a film photo are obtainable when printing is done with an ink-jet printer.

Further, the mean roughness (Ra) of the surface of the undercoat layer is preferably not greater than 0.1 $\mu$m. Then higher printing quality is available because the roughness of the undercoat layer becomes almost unconfirmable through visual inspection.

Further, it is preferable that the undercoat layer includes at least a white ink layer. As color development is mainly improved thereby, enhanced printing quality becomes available.

A method of producing an optical recording medium, according to the first aspect of the invention, includes a first step of forming an undercoat layer by a screen printing method on the label side of a disc body so that the mean roughness (Ra) of the surface of the undercoat layer is not greater than 0.2 $\mu$m, and a second step of forming an ink receiving layer on the undercoat layer by a spin coating method or a slit coating method.

Further, a method of producing an optical recording medium includes a first step of forming an uncured undercoat layer containing ultraviolet-curable resin by a screen printing method on the label side of a disc body, a second step of curing the uncured undercoat layer by irradiating the undercoat layer with ultraviolet rays, and a third step of forming an ink receiving layer on the cured undercoat layer by a spin coating method or a slit coating method, wherein a duration of time required until the second step is taken after the completion of the first step is set longer than the time required to make the mean roughness (Ra) of the surface of the uncured undercoat layer not greater than 0.2 $\mu$m after the completion of the first step. With the arrangement above, the optical recording medium having the ink receiving layer with the reduced surface roughness becomes producible thereby.

Since the mean roughness (Ra) of the surface of the undercoat layer as the undercoat of the ink receiving layer is thus set not greater than 0.2 $\mu$m and preferably not greater than 0.1 $\mu$m according to the invention, it is ensured that the mean roughness (Ra) of the surface of the ink receiving layer is reducible. Consequently, color development and gloss close to those of a film photo are obtainable when printing is done with an ink-jet printer.

Further, an optical recording medium, according to a second aspect of the invention, includes a disc-shaped body, and at least an ink receiving layer which is provided on the label side of the disc body and has a step (difference in level) radially extended, wherein the step is not greater than 1.0 μm. Since the step on the ink receiving layer is not greater than 1.0 μm according to the invention, the step remains unconfirmable through visual inspection unless the step is observed from various angles when printing is done with the printer. Accordingly, high printing quality can be secured even though the ink receiving layer is formed by a method, such as the spin coating method, of causing a step (difference in level) to rise in the radial direction.

Further, the step is preferably not greater than 0.5 μm. On condition that the step is not greater than 0.5 μm, the step is hardly confirmable through visual inspection unless observed with special attention from various angles after printing is done with the printer, so that printing quality is almost never badly affected thereby.

It is preferable to further provide an undercoat layer between the label side of the disc body and the ink receiving layer. Printing quality can be enhanced further by providing the undercoat layer.

A method of producing an optical recording medium, according to the second aspect of the invention, includes a first step of forming a coating film by a slit coating method on the label side of a disc-shaped body, and a second step of forming an ink receiving layer by drying the coating film, is characterized in that a step produced at a joint portion where a liquid-application starting area and a liquid-application terminating area by using the slit coating method overlap each other is set not greater than 1.0 μm after the completion of the second step.

A method of producing an optical recording medium, according to the second aspect of the invention, includes a first step of forming a coating film on the label side of a disc-shaped body by rotationally moving the positional relation between a head having a slit for supplying an application liquid and the disc body, a second step of making a step has a gentle slop by turning the disc body in a joint portion where a liquid-application starting area and a liquid-application terminating area overlap each other, and a third step of forming an ink receiving layer by drying the coating film. In this case, the rotational time at the second step is set longer than the time required to make the step not greater than 0.1 μm after the completion of the third step. With the arrangement above, the optical recording medium having the ink receiving layer with the step with reduced difference in level becomes producible thereby.

As the step radially formed on the ink receiving layer is thus restrained to not greater than 1.0 μm and preferably not greater than 0.5 μm according to the invention, the step becomes inconspicuous when printing is done with the ink-jet printer, so that high printing quality can be secured.

BRIEF DESCRIPTION OF THE DRAWINGS

FIG. 2A is a CD type disc, FIG. 2B is a DVD type disc and FIG. 2C is a next-generation type disc.

FIG. 3A indicates the positional relation between the disc body 11 and a slit; and FIG. 3B, a coating area after the slit coating.

DETAILED DESCRIPTION OF THE PREFERRED EMBODIMENTS

A description will now be described of the preferred embodiment of the invention with reference to the accompanying drawings.

Figure 1:
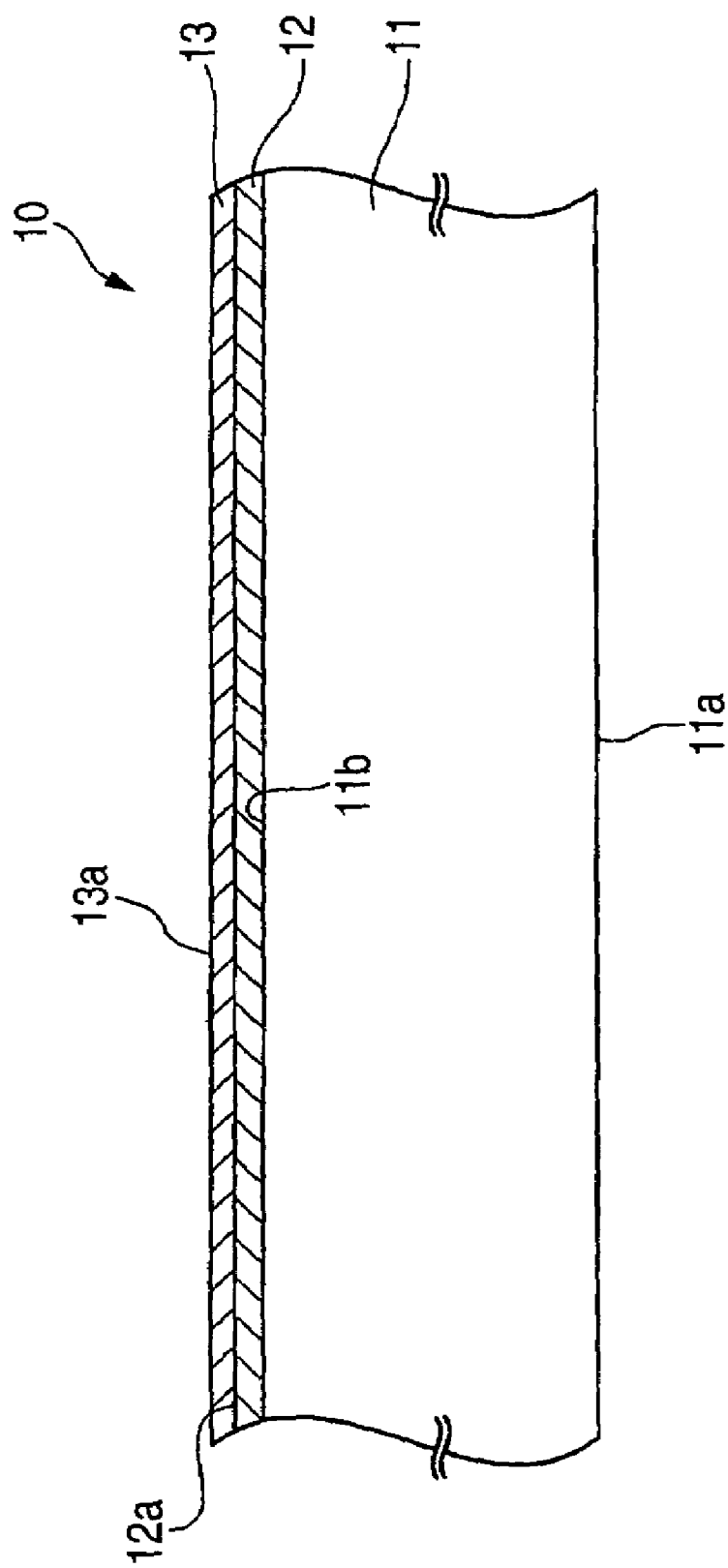
FIG. 1 is a schematic sectional view of the structure of an optical recording medium 10 according to the preferred embodiment of the invention.

FIG. 1 is a schematic sectional view of the structure of an optical recording medium according to the preferred embodiment of the invention.

As shown in FIG. 1, an optical recording medium 10 according to the embodiment of the invention comprises a disc body 11, a white ink layer 12 provided on the label side 11b of the disc body 11 and an ink receiving layer 13 provided on the white ink layer 12. The white ink layer 12 is a layer formed as the undercoat of the ink receiving layer 13 and the layer provided between the label side 11b of the disc body 11 and the ink receiving layer 13 may be called a "undercoat layer".

The disc body 11 has a light incident side 11a onto which a laser beam is emitted at the time of recording and/or playback and a label side 11b as the back of the light incident side 11a. Disc bodies 11 are not particularly restricted in kind but can be CD type discs such as CD-ROM, CD-R and CD-RW; DVD type discs such as DVD-ROM, DVD-R and DVD-RW; and further next-generation type optical discs for which a laser beam in the blue wavelength region is used.

Figure 2A:
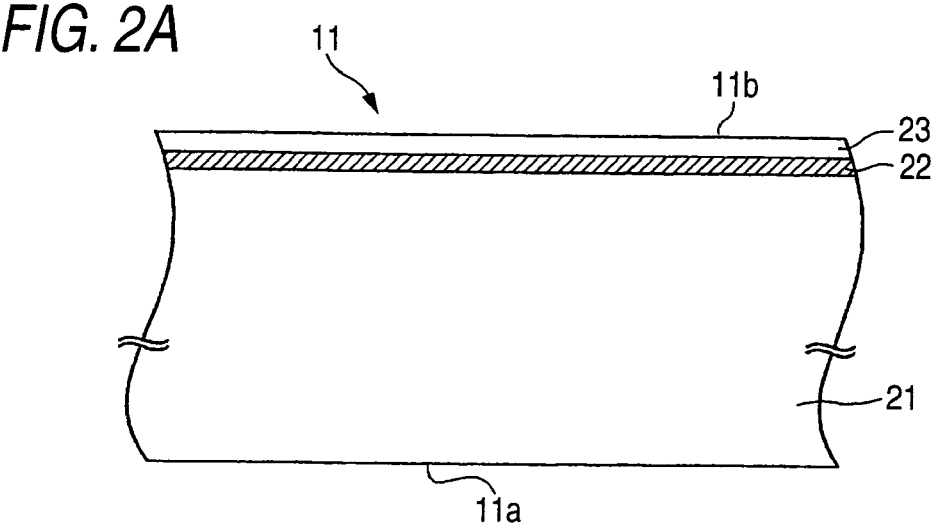
FIGS. 2A to 2C show examples of disc bodies 11 to which the invention is properly applicable.
Figure 2B:
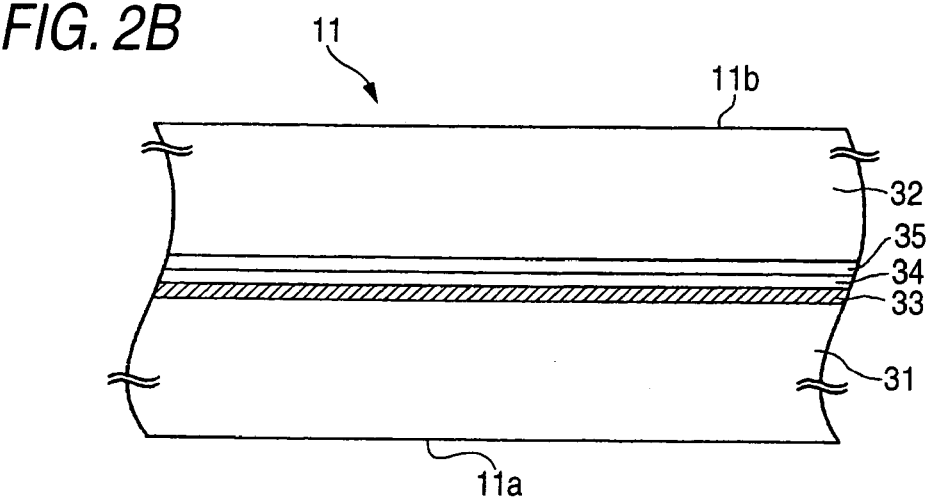
Figure 2C:
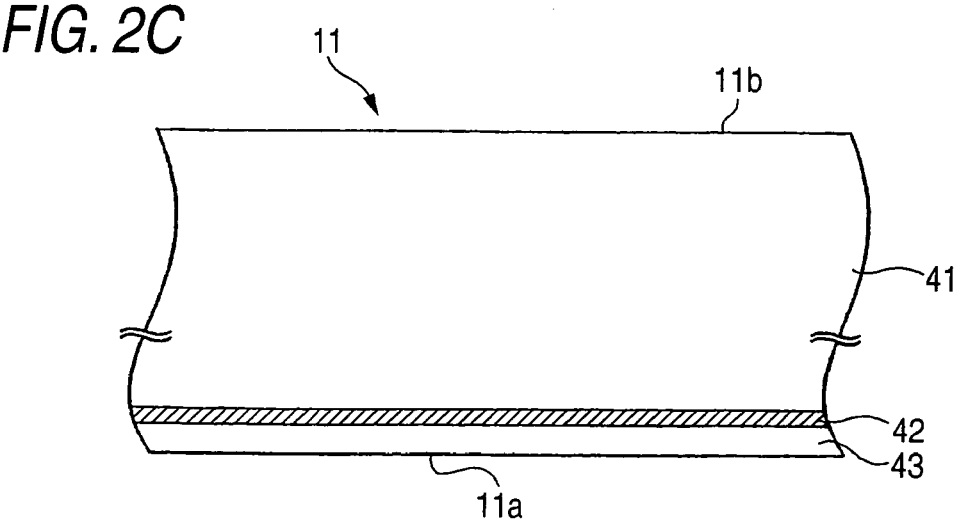

FIGS. 2A to 2C show examples of disc bodies 11 to which the invention is properly applicable, including FIG. 2A is a CD type disc, FIG. 2B a DVD type disc and FIG. 2C a next-generation type disc.

As shown in FIG. 2A, the CD type disc has a light-transmission substrate 21 about 1.2 mm thick with its one side used as the light incident side 11a, a functional layer 22 provided on the other side of the light-transmission substrate 21 and a protective layer 23 covering the functional layer 22, the surface of the protective layer 23 corresponding to the label side 11b. Accordingly, the white ink layer 12 and the ink receiving layer 13 are provided on the surface (label side 11b) of the protective layer 23 when the CD type disc shown in FIG. 2A is used as the disc body 11. Generally, the structure and material of the functional layer 22 vary with the kind of the disc as follows: in the case of a ROM type disc such as CD-ROM, the functional layer 22 is formed with a reflective layer containing metal; in the case of a WO type disc such as CD-R, the functional layer 22 is formed with a recording layer containing organic coloring matter as well as a reflective layer containing metal, formed on the recording layer; and in the case of a rewritable disc such as CD-RW is formed with a recording layer containing phase-change material, a plurality of dielectric layers with the recording layer held therebetween and a reflective layer containing metal.

As shown in FIG. 2B, the DVD type disc has a light-transmission substrate 31 about 0.6 mm thick with its one side used as the light incident side 11a, a dummy substrate 32 with its one side used as the label side 11b, a functional layer 33 provided on the other side of the light-transmission substrate 31, a protective layer 34 covering the functional layer 33, and an adhesive layer 35 for bonding the laminate composed of the light-transmission substrate 31, the functional layer 33 and the protective layer 34 to the adhesive layer 35. Accordingly, the white ink layer 12 and the ink receiving layer 13 are provided on the surface (label side 11b) of the dummy substrate 32 when the DVD type disc shown in FIG. 2(b) is used as the disc body 11. Generally, as described above, the structure and material of the functional layer 33 vary with the kind of the disc as follows: in the case of a ROM type disc such as DVD-ROM like the CD type disc, the functional layer 33 is formed with a reflective layer containing metal; in the case of a WO type disc such as DVD-R, the functional layer 33 is formed with a recording layer containing organic coloring matter as well as a reflective layer containing metal, formed on the recording layer; and in the case of a rewritable disc such as DVD-RW is formed with a recording layer containing phase-change material, a plurality of dielectric layers with the recording layer held therebetween and a reflective layer containing metal.

As shown in FIG. 2C, the next-generation type disc has a support substrate 41 about 1.1 mm with its one end used as the label side 11b, a functional layer 42 provided on the other side of the support substrate 41 and a light-transmission substrate 43 covering the functional layer 42, the surface of the light-transmission substrate 43 corresponding to the light incident side 11a. Accordingly, the white ink layer 12 and the ink receiving layer 13 are provided on the surface (label side 11b) of the support substrate 41 when the next-generation type disc shown in FIG. 2C is used as the disc body 11. Generally, the structure and material of the functional layer 42 vary with the kind of the disc; in the case of a rewritable disc proposed now, the functional layer 42 is formed with a recording layer containing phase-change material, a plurality of dielectric layers with the recording layer held therebetween and a reflective layer containing metal.

Although the discs shown in FIGS. 2A to 2C are disc-shaped and about 1.2 mm in thickness and about 120 mm in diameter, discs to which the invention is applicable are not limited to those shown therein but may be one of any type as long as it has the light incident side 11a and the label side 11b opposite thereto. Moreover, the disc-like external form is not indispensable and not only the light incident side 11a but also the label side 11b may be rectangular.

The white ink layer 12 and the ink receiving layer 13 will be described next.

The white ink layer 12 is a white-colored layer (undercoat layer) as the undercoat of the ink receiving layer 13 and provided so as to improve printing quality by mainly improving the color development. According to the invention, the mean roughness (Ra) of the surface 12a of the white ink layer 12 is set not greater than 0.2 µm and preferably not greater than 0.1 µm. Although the thickness of the white ink layer 12 is not particularly restricted but may preferably be set not less than 8 µm and not greater than 15 µm. As the material of the white ink layer 12, use can typically be made of material containing ultraviolet-curable resin and especially ultraviolet-curable acrylic resin containing not less than 10 wt % and not greater than 30 wt % of titanium oxide as well as having a lower shrinkage factor.

It is preferable to form the white ink layer 12 by the screen printing method. More specifically, it is preferable to cure the white ink layer 12 by irradiating the layer with ultraviolet rays after the uncured white ink layer 12 containing ultraviolet-curable resin is formed by the screen printing method. This is because the use of the screen printing method for forming the white ink layer 12 makes the film thickness substantially constant in the inner and outer peripheral portions as the film thickness distribution becomes reduced. In case that the film distribution of the white ink layer 12 is large, there is the possibility that a difference in color development is caused between the thin and thick areas of the white ink layer 12.

When the white ink layer 12 is formed by the screen printing method, many irregularities corresponding to the screen mesh are formed on the surface 12a with the white ink layer 12 uncured immediately after the screen printing and the mean roughness (Ra) exceeds 0.2 µm and typically remains at about 0.3 µm. In order to smooth the irregularities and to set the mean roughness (Ra) of the surface 12a not greater than 0.2 µm, the leveling of the surface 12a is needed by placing time to some extent until the white ink layer 12 is cured by irradiating the layer with ultraviolet rays. The time required for leveling the surface 12a varies with the composition of the resin used to form the white ink layer 12, the kind and quantity of a leveling agent to be added, whereupon a proper time corresponding to the requirement has to be set.

Although the mean roughness (Ra) of the surface 12a is made reducible simply by using the spin coating method for forming the white ink layer 12, the use of the spin coating method may make a difference in film thickness between the inner and outer peripheral portions (e.g., resulting in a thin inner peripheral portion and a thick outer peripheral portion) and this is unpreferable because a difference in color development arises when printing is done with a printer.

The ink receiving layer 13 is a layer formed as the outermost layer on one side of the optical recording medium 10 and performs the role of fixing ink on receiving the ink supplied from an ink-jet printer. Printing quality, especially color development and gloss are improved when printing is done with the printer by minimizing the mean roughness (Ra) of the surface 13a of the ink receiving layer 13. In order to obtain so-called photographic image quality in terms of color development and gloss close to the quality of a film photo, the mean roughness (Ra) of the surface 13a of the ink receiving layer 13 is required to be not greater than 0.2 µm and preferably not greater than 0.1 µm. The thickness of the ink receiving layer 13 is not particularly restricted but may preferably be set not less than 10 µm and not greater than 30 µm. The ink receiving layer 13 is preferably made of material with hydrophilic resin such as polyvinyl alcohol and polyvinyl acetal as the main ingredients mixed with cationic polymer as an ink fixing agent.

According to the invention, the spin coating method or the slit coating method is used to form the ink receiving layer 13. As is well known, the spin coating method includes the steps of dropping an application liquid (a liquid prepared by diluting the material of the ink receiving layer 13 dissolved in a solvent with water or any other solvent) onto the center or the vicinity of the center of the surface (12a) of an object to be processed and turning the processing object whereby to spread the application liquid in the outer peripheral direction by centrifugal force. On the other hand, the slit coating method includes the steps of supplying an application liquid from a slit provided in a head and spreading the application liquid over the surface of an object to be processed by moving the relative position between the head and the processing object. The slit coating method is a coating method normally used for the processing object (e.g., a display panel) having a rectangular surface and in case where this method is used for disc-shaped objects to be processed such as optical discs in general, a great deal of difficulty is accompanied thereby. Consequently, it is necessary to devise a way to deal with the case where the disc body 11 is disc-shaped.

The reason for the use of the spin coating method or the slit coating method for forming the ink receiving layer 13 is that the mean roughness (Ra) of the surface 13a can be made reducible by using one of these coating methods. Although the distribution of the film thickness of the ink receiving layer 13 tends to grow larger with the spin coating method or the slit coating method used in comparison with the use of the screen printing method, the printing quality is hardly affected by a modicum of the film thickness distribution since the ink receiving layer 13 is fundamentally transparent.

When the ink receiving layer 13 is formed by the spin coating method or the slit coating method, the surface property of the white ink layer 12 as the undercoat is greatly reflected on the formation of the ink receiving layer 13 unlike the case of using the screen printing method. In other words, the mean roughness (Ra) of the surface 12a of the white ink layer 12 directly appears as the mean roughness (Ra) of the surface 13a of the ink receiving layer 13. Consequently, the mean roughness (Ra) of the surface 12a of the white ink layer 12 is set not greater than 0.2 $\mu$m according to the invention, whereby the mean roughness (Ra) of the surface 13a of the ink receiving layer 13 can also be set not greater than 0.2 $\mu$m.

As the mean roughness (Ra) of the surface 12a of the white ink layer 12 is not greater than 0.2 $\mu$m in the optical recording medium 10 thus configured, the mean roughness (Ra) of the surface 13a of the ink receiving layer 13 is sufficiently reducible. Accordingly, color development and gloss close to those of the film photo are obtainable when printing is done with the ink-jet printer.

A description will now be given of a method of forming the ink receiving layer 13 on the disc-shaped body 11 by the slit coating method.

Figure 3A:
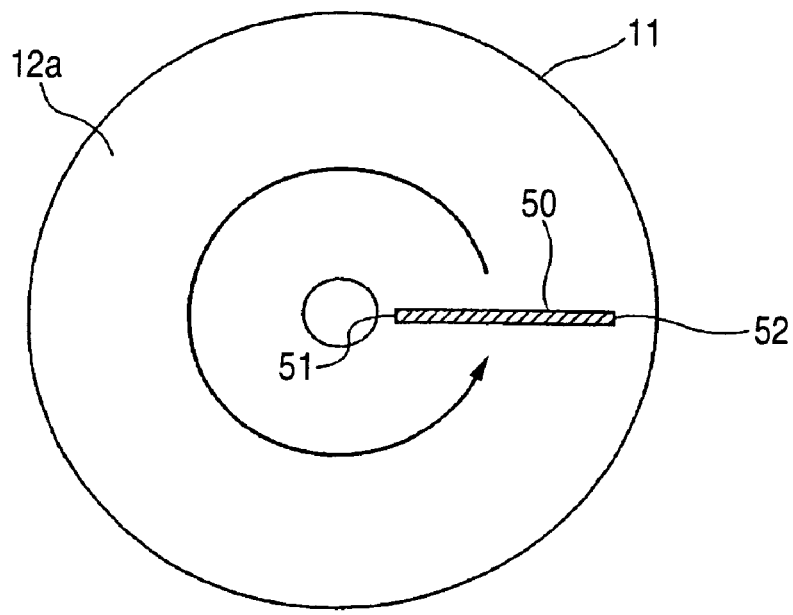
FIGS. 3A and 3B are schematic depiction illustrating the way to form an ink receiving layer 13 on the disc-shaped body 11 by the slit coating method.
Figure 3B:
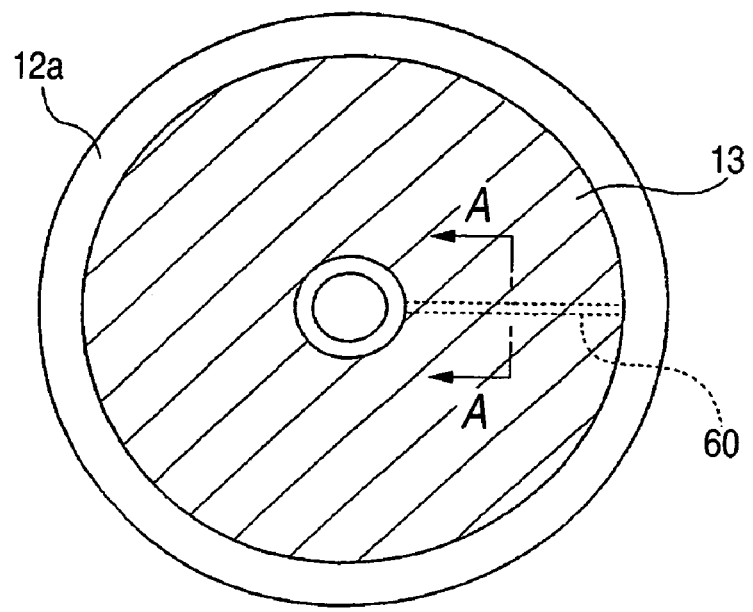

FIGS. 3A and 3B are schematic depiction illustrating the way to form the ink receiving layer 13 on the disc-shaped body 11 by the slit coating method: FIG. 3A indicates the positional relation between the disc body 11 and the slit; and FIG. 3B, a coating area by means of slit coating.

As shown in FIG. 3A, the longer direction of a slit 50 is matched to the radial direction of the disc body 11 so that one end 51 of the slit 50 provided on a head (not shown) for use in supplying an application liquid matches with the innermost peripheral portion of a coating area and that the other end 52 of the slit 50 matches with the outermost peripheral portion of the coating area when a slit coat is applied to the disc-shaped body 11. The disc body 11 is turned or the head is turned along the disc body 11 in this condition whereby to move the relative positional relation therebetween. As shown in FIG. 3B, the application liquid is spread in the form of a doughnut on the coating surface (surface 12a of the white ink layer 12) and then the ink receiving layer 13 is formed by letting the solvent evaporate.

Figure 4:
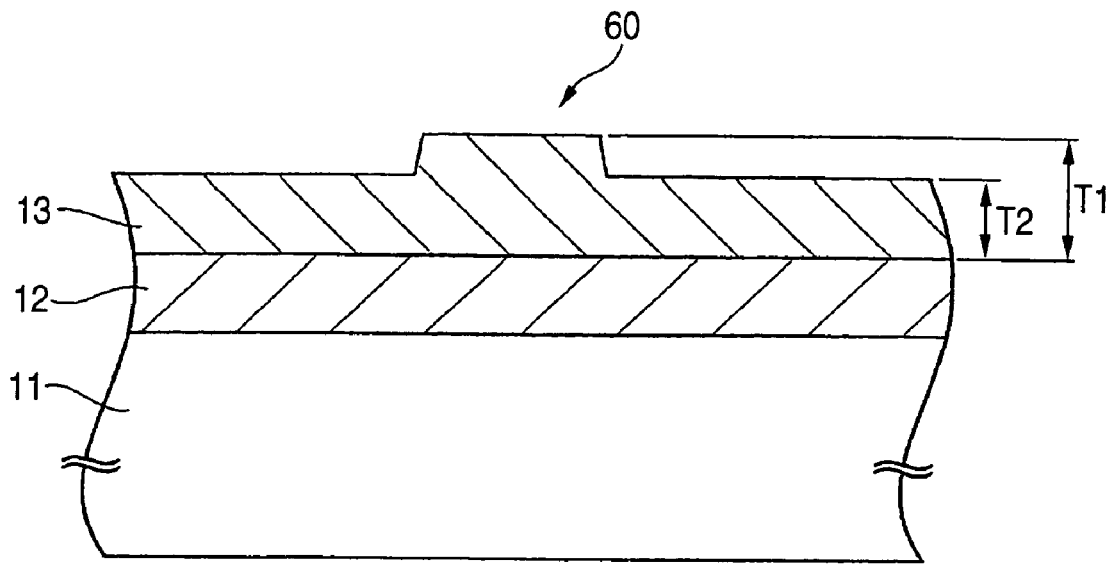
FIG. 4 is a schematic sectional view taken on line A—A of FIG. 3B.

Since an object to be processed is disc-shaped, however, a liquid-application starting area substantially matches with a liquid-application ending area unlike the case of coating an object to be processed such as a display panel having a rectangular surface. Therefore, as shown in FIG. 3B, the film thickness of an area 60 forming a joint becomes slightly greater than the thickness of any other portion. In other words, there is produced a slight difference in level in the area 60 where the joint is formed. FIG. 4 is a sectional view taken on line A—A of FIG. 3B, showing the condition above. As shown in FIG. 4, the film thickness T1 of the area 60 as the joint and the mean film thickness T2 on the periphery of the area 60 have a relationship of T1>T2, so that a step, that is difference in level therebetween, as defined by T1–T2 arises.

In case that the step radially extended grows larger, the joint becomes conspicuous when printing is done with the printer, so that printing quality is badly affected thereby. In consideration of this fact, the step (=T1–T2) is set not greater than 1.0 $\mu$m and preferably not greater than 0.5 $\mu$m according to the invention. This is because the step remains unconfirmable through visual inspection unless the step is observed from various angles when printing is done with the printer on condition that it is not greater than 1.0 $\mu$m. In case that the step is not greater than 0.5 $\mu$m, the step is made unconfirmable through visual inspection unless it is observed with special attention from various angles after the printer is used for printing data, so that printing quality is almost not badly affected thereby.

When the coating film is dried immediately after slit coating is completed, such a step (difference in level) normally exceeds 1.0 $\mu$m and in order to make the step have a gentle slope up to a level not greater than 1.0 $\mu$m, the disc body 11 has to be turned for a certain interval of time until the coating film is heat-dried after slit coating is carried out so as to subject the surface 13a to leveling by centrifugal force. As the time required for leveling varies with the composition of the material used for the disc body 11, the kind and quantity of the solvent used to dissolve the material and further the number of revolutions of the disc body 11, the time required therefor has to be properly set. With respect to the number of revolutions of the disc body 11 at the leveling time, the number of revolutions has to be set smaller to the extent that the film thickness of the ink receiving layer 13 is not excessively decreased; for example, not less than 50 rpm and not greater than 300 rpm.

Figure 5:
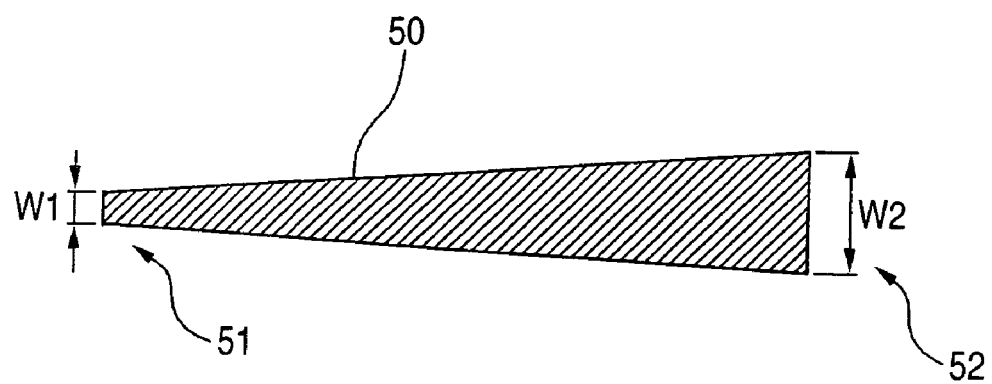
FIG. 5 is a schematic plan view of a fan-shaped slit 50.

Since an object to be processed is disc-shaped, moreover, the object has a distinctive character in that the linear velocity of the head differs between the inner and outer peripheral portions of the coating surface. In case the application liquid supplied by the slit 50 is uniform from one end 51 corresponding to the innermost periphery over the other end 52 corresponding to the outermost periphery, it is likely that the ink receiving layer 13 formed becomes thick in the inner peripheral portion and becomes thin in the outer peripheral portion. When the printing quality is not affected by the difference in film thickness above, no problem is offered but it is preferable that the distribution of the film thickness of the ink receiving layer 13 is restrained by increasing the amount of application liquid supplied from one end 51 corresponding to the innermost periphery to the other end 52 corresponding to the outermost periphery; in order to realize this, the profile of the slit 50 is fan-shaped as shown in FIG. 5 by setting the slit width W2 at the other end 52 corresponding to the outermost peripheral portion greater than the slit width W1 at one end 51 corresponding to the innermost peripheral portion of an area to be coated therewith.

When the ink receiving layer 13 is formed by the slit coating method, the surface property of the white ink layer 12 as the undercoat is greatly reflected on the formation of the ink receiving layer 13 unlike the case of using the screen printing method. In other words, the mean roughness (Ra) of the surface 12a of the white ink layer 12 directly appears as the mean roughness (Ra) of the surface 13a of the ink receiving layer 13. Consequently, the mean roughness (Ra) of the surface 12a of the white ink layer 12 is preferably set not greater than 0.2 μm, whereby the mean roughness (Ra) of the surface 13a of the ink receiving layer 13 can also be set not greater than 0.2 μm.

The optical recording medium 10 according to the embodiment of the invention is thus formed by the producing method as described above.

In the optical recording medium 10 thus formed, the step in the area 60 as the joint of the ink receiving layer 13 is restrained to not greater than 1.0 μm, so that the joint becomes substantially inconspicuous when printing is done with the printer. Moreover, the mean roughness (Ra) of the surface 13a of the ink receiving layer 13 is made sufficiently reducible by setting the mean roughness (Ra) of the surface 12a of the white ink layer 12 not greater than 0.2 μm, whereby color development and gloss close to those of the film photo are obtainable when printing is done with the ink-jet printer.

As set forth above, the mean roughness (Ra) of the surface 12a of the white ink layer 12 as the undercoat of the ink receiving layer 13 is set not greater than 0.2 μm and preferably not greater than 0.1 μm to ensure that the mean roughness (Ra) of the surface 13a of the ink receiving layer 13 formed by the spin coating method or the slit coating method is made reducible thereby. Consequently, color development and gloss close to those of the film photo are obtainable when printing is done with the ink-jet printer.

Further, since the step at the joint area 60 of the ink receiving layer 13 formed by the slit coating method according to the embodiment of the invention is restrained to not greater than 1.0 μm and preferably not greater than 0.5 μm, the join becomes inconspicuous even when printing is done with the ink-jet printer, so that high printing quality is available.

The invention is not limited to the embodiment described above but may include various changes and modifications within the scope of the invention as hereinafter claimed and such changes and modifications are needless to say intended to be within the scope thereof.

For example, though the white ink layer 12 is formed directly on the label side 11b of the disc body 11 in the optical recording medium 10 according to the above embodiment of the invention, another layer may be placed between the disc body 11 and the white ink layer 12. Although another layer can be placed between the white ink layer 12 and the ink receiving layer 13, further, the mean roughness (Ra) of the layer placed beneath the ink receiving layer 13 has to be not greater than 0.2 μm in this case. In other words, the mean roughness (Ra) of the surface of the undercoat layer existing between the label side 11b of the disc body 11 and the ink receiving layer 13 is only needed to be set not greater than 0.2 μm.

For example, though the white ink layer 12 is formed directly on the label side 11b of the disc body 11 in the optical recording medium 10 according to the above embodiment of the invention, another layer may be placed between the disc body 11 and the white ink layer 12. Although another layer can be placed between the white ink layer 12 and the ink receiving layer 13, the mean roughness (Ra) of the surface of the layer placed beneath the ink receiving layer 13 is preferably not greater than 0.2 μm in this case. In other words, the mean roughness (Ra) of the surface of the undercoat layer existing between the label side 11b of the disc body 11 and the ink receiving layer 13 is preferably not greater than 0.2 μm.

Although the step is made to have a gentle slope by turning the disc body 11 after the coating film is formed by the slit coating method, the coating film may undergo natural leveling not by turning the disc body 11 but by simply leaving the coating film as it is. However, it is preferred for the leveling to be achieved by turning the disc body as in the above embodiment of the invention when it is taken into consideration that time allowing the natural leveling to be achieved is limited and that the leveling requires time.

EXAMPLES

A description will now be given of examples of the invention, which is not limited in any way to the following examples thereof, however.

Sample Making

Example 1

A sample of an optical recording medium having the same structure as that of the optical recording medium 10 shown in FIG. 1 was produced by the following method. With respect the disc body 11, a disc of the DVD structure shown in FIG. 2B was used.

First, an ultraviolet-curable resin about 10 μm thick was formed on the surface (label side 11b) of a dummy substrate 32 by screen printing using a screen mesh of No. #420. As the material of the ultraviolet-curable resin, Seika-Beam SCR-VID F29 white of Dainichiseika Color & Chemicals Mfg. Co., Ltd was used.

Then the ultraviolet-curable resin thus formed was irradiated with ultraviolet rays to form a white ink layer 12 by curing the resin. A duration of five minutes was set from the screen printing up to ultraviolet radiation. Further, the surface roughness of the surface 12a of the white ink layer 12 was measured by using Surfcorder SE-3400 of Kosaka Laboratory Ltd. As a result, the mean roughness (Ra) of the surface 12a of the white ink layer 12 was 0.026 μm and the maximum roughness (Ry) thereof was 0.18 μm.

An application liquid containing 10–15 wt % of PVA (polyvinyl alcohol), 75–85 wt % of water, 5–10 wt % of IPA (isopropyl alcohol) and not greater than 5 wt % of other material was dropped by the spin coating method and applied to the surface 12a of the white ink layer 12 by turning the disc body 11. Then the coating film was dried at 80° C. for five minutes to form an ink receiving layer 13 about 10 μm thick thereby. The shake-off number of revolutions in spin coating was set to 400 rpm. Then the Surfcorder SE-3400 mentioned above was used to measure the surface roughness of the surface 13a of the ink receiving layer 13. As a result, the mean roughness (Ra) of the surface 13a of the ink receiving layer 13 was 0.026 μm and the maximum roughness (Ry) thereof was 0.18 μm.

Thus, the sample according to Example 1 of the invention was completed.

Example 2

An example 2 of the invention was produced as in example 1 thereof except that when the white ink layer 12 was formed, a duration of three minutes was set from the screen printing up to ultraviolet radiation. As a result, the mean roughness (Ra) of the surface 12a of the white ink layer 12 was 0.032 μm and the maximum roughness (Ry) thereof was 0.21 μm. Moreover, the mean roughness (Ra) of the surface 13a of the ink receiving layer 13 was 0.030 μm and the maximum roughness (Ry) thereof was 0.20 μm.

Example 3

An example 3 of the invention was produced as in example 1 thereof except that when the white ink layer 12 was formed, a duration of one minute and 30 seconds was set from the screen printing up to ultraviolet radiation. As a result, the mean roughness (Ra) of the surface 12a of the white ink layer 12 was 0.09 μm and the maximum roughness (Ry) thereof was 0.38 μm. Moreover, the mean roughness (Ra) of the surface 13a of the ink receiving layer 13 was 0.08 μm and the maximum roughness (Ry) thereof was 0.28 μm

Example 4

An example 4 of the invention was produced as in example 1 thereof except that when the white ink layer 12 was formed, a duration of one minute was set from the screen printing up to ultraviolet radiation. As a result, the mean roughness (Ra) of the surface 12a of the white ink layer 12 was 0.11 μm and the maximum roughness (Ry) thereof was 0.62 μm. Moreover, the mean roughness (Ra) of the surface 13a of the ink receiving layer 13 was 0.09 μm and the maximum roughness (Ry) thereof was 0.41 μm.

Comparative Example 1

A comparative example 1 was produced as in example 1 of the invention except that when a white ink layer 12 was formed, a duration of 30 seconds was set from the screen printing up to ultraviolet radiation. As a result, the mean roughness (Ra) of the surface 12a of the white ink layer 12 was 0.21 μm and the maximum roughness (Ry) thereof was 0.94 μm. Moreover, the mean roughness (Ra) of the surface 13a of the ink receiving layer 13 was 0.14 μm and the maximum roughness (Ry) thereof was 0.87 μm.

Comparative Example 2

A comparative example 2 was produced as in example 1 of the invention except that when the white ink layer 12 was formed, a duration of 2 seconds was set from the screen printing up to ultraviolet radiation. As a result, the mean roughness (Ra) of the surface 12a of the white ink layer 12 was 0.28 μm and the maximum roughness (Ry) thereof was 1.24 μm. Moreover, the mean roughness (Ra) of the surface 13a of the ink receiving layer 13 was 0.19 μm and the maximum roughness (Ry) thereof was 0.95 μm.

Evaluation of Samples

Printing was actually done on the ink receiving layers 13 in the examples 1–4 and those of comparative examples 1–2 by using a printer BJF950i of Canon Inc. by adjusting the paper setting to 'printable disc (recommended product),' the printing quality to 'standard' and the cartridge to 'photo.' Then the printing quality (color development, gloss and mesh traces) of the those samples was evaluated through visual inspection. Table 1 shows the results. The duration of time from the screen printing up to ultraviolet radiation, the mean roughness (Ra) of the surface 12a of the white ink layer 12 and the maximum roughness (Ry) thereof are shown collectively in Table 1.

TABLE 1

|  | Comparative example 2 | Comparative example 1 | Example 4 | Example 3 | Example 2 | Example 1 |
| --- | --- | --- | --- | --- | --- | --- |
| Duration of time from screen printing up to ultraviolet radiation | 2 sec. | 30 sec. | 1 min. | 1.3 min. | 3 min. | 5 min. |
| Ra (μm) | 0.28 | 0.21 | 0.11 | 0.09 | 0.032 | 0.026 |
| Ry (μm) | 1.24 | 0.94 | 0.62 | 0.38 | 0.21 | 0.18 |
| Texture · gloss | Δ | Δ | ○ | ○ | ○ | ○ |
| Undercoat roughness | x | Δ | Δ | ○ | ○ | ○ |

Texture · gloss: Δ = ordinary, ○ = good

Undercoat roughness: x = readily confirmable, Δ = confirmable and ○ = unconfirmable.

As shown in Table 1, color development and gloss were very good in the samples according to examples 1–4 of the invention in which the mean roughness (Ra) of the surfaces 12a of the white ink layers 12 was not greater than 0.2 μm. Particularly in the samples according to examples 1–3 of the invention in which the mean roughness (Ra) of the surfaces 12a of the white ink layers 12 was not greater than 0.1 μm, the roughness of the white ink layers 12 became unconfirmable through visual inspection, so that the printing quality was substantially equal to that of the film photo.

On the contrary, comparative examples 1 and 2 in which the mean roughness (Ra) of the surfaces 12a of the white ink layers 12 exceeded 0.2 μm were obviously inferior in color development as well as gloss to the samples according to examples 1–4 of the invention and the roughness of the white ink layers 12 became readily confirmable.

Example 5

An example of an optical recording medium having the same structure as that of the optical recording medium 10 shown in FIG. 1 was produced by the following method. With respect the disc body 11, a disc of the DVD structure shown in FIG. 2B was used.

First, an ultraviolet-curable resin about 10 μm thick was formed on the surface (label side 11b) of a dummy substrate 32 by screen printing using a screen mesh of No. #420. As the material of the ultraviolet-curable resin, Seika-Beam SCR-VID F29 white of Dainichiseika Color & Chemicals Mfg. Co., Ltd was used.

Then the ultraviolet-curable resin thus formed was irradiated with ultraviolet rays to form a white ink layer 12 by curing the resin. A duration of one minute was set from the screen printing up to ultraviolet radiation.

Further, a head having a fan-shaped slit having a slit width W1 of 0.08 mm at one end 51 corresponding to the innermost peripheral portion and a slit width W2 of 0.12 mm at the other end 52 corresponding to the outermost peripheral portion is used. The head is placed closer up to 0.90 mm to the surface 12a of a white ink layer 12 and by turning a disc body 11 at 14 rpm in this condition, an application liquid (having a viscosity of 500 cps) containing 10–15 wt % of PVA (polyvinyl alcohol), 75–85 wt % of water, 5–10 wt % of IPA (isopropyl alcohol) and not greater than 5 wt % of other material was applied by slit coating to the surface 12a of the white ink layer 12 within a 20–58 mm radius from the center of the disc body 11. Then the coating film was subjected to leveling by turning the disc body 11 at 100 rpm for 15 seconds before being dried at 80° C. for five minutes whereby to form an ink receiving layer 13 about 10 $\mu$m thick.

Thus, the example 5 of the invention was completed.

Further, ETA-RT of STEAG ETA-OPTIC GmbH Co. was used to measure the coating film of the ink receiving layer 13 at a 40 mm radial point by an optical interference method. As a result, the film thickness of an area 60 as a joint portion was 10.2 $\mu$m and the mean roughness (Ra) thereof on the periphery of the area 60 was 9.8 $\mu$m.

Example 6

An example 6 of the invention was produced as in example 5 thereof except that when the ink receiving layer 13 was formed, a duration of 10 seconds was set as leveling time by turning. As a result, the film thickness of the ink receiving layer 13 at the 40 mm radial point was 10.6 $\mu$m in the area 60 as the joint portion and the mean film thickness thereof on the periphery of the area 60 was 10.1 $\mu$m.

Example 7

An example 7 of the invention was produced as in example 5 thereof except that when the ink receiving layer 13 was formed, a duration of six seconds was set as leveling time by turning. As a result, the film thickness of the ink receiving layer 13 at the 40 mm radial point was 10.6 $\mu$m in the area 60 as the joint portion and the mean film thickness thereof on the periphery of the area 60 was 9.8 $\mu$m.

Comparative Example 3

A comparative example 3 was produced as in example 5 thereof except that when an ink receiving layer 13 was formed, a duration of four seconds was set as leveling time by turning. As a result, the film thickness of the ink receiving layer 13 at the 40 mm radial point was 11.6 $\mu$m in the area 60 as the joint portion and the mean film thickness thereof on the periphery of the area 60 was 10.2 $\mu$m.

Comparative Example 4

A comparative example 4 was produced as in example 5 thereof except that when the ink receiving layer 13 was formed, a duration of two seconds was set as leveling time by turning. As a result, the film thickness of the ink receiving layer 13 at the 40 mm radial point was 12.4 $\mu$m in the area 60 as the joint portion and the mean film thickness thereof on the periphery of the area 60 was 10.1 $\mu$m.

[Evaluation of Samples]

Printing was actually done on the ink receiving layers 13 in the samples according to examples 5–7 and those of comparative examples 3 and 4 by using the printer BJF950i of Canon Inc. by adjusting the paper setting to 'printable disc (recommended product),' the printing quality to 'standard' and the cartridge to 'photo.' Then the joint portions of those samples were evaluated through visual inspection. Table 2 shows the results. The film thickness (=T1) of the ink receiving layers 13 in the areas 60 as the joint portions, the mean film thickness (=T2) of the ink receiving layers 13 on the periphery of the areas 60 and differences in the film thickness (steps) (=T1−T1) thereof are shown collectively in Table 2.

TABLE 2

|  | Comparative example 2 | Comparative example 1 | Example 3 | Example 2 | Example 1 |
| --- | --- | --- | --- | --- | --- |
| Leveling time by turning | 2 sec. | 4 sec. | 6 sec. | 10 sec. | 15 sec |
| Film thickness ($\mu$m) of ink receiving layer 13 in area 60 | 12.4 | 11.6 | 10.6 | 10.6 | 10.2 |
| Mean film thickness ($\mu$m) of ink receiving layer 13 in peripheral area of area 60 | 10.1 | 10.2 | 9.8 | 10.1 | 9.8 |
| Difference in film thickness (step) | 2.3 | 1.4 | 0.8 | 0.5 | 0.4 |
| External appearance of joint | x | x | ○ | ⊙ | ⊙ |

External appearance of joint: x = readily confirmable; ○ = confirmable if observed carefully; ⊙ = substantially unconfirmable.

As shown in Table 2, the joint portions were substantially inconspicuous whereby to secure high printing quality in the samples according to Embodiments 5–7 of the invention in which differences in the film thickness (steps) were not greater than 1.0 $\mu$m. Particularly in the samples according to Embodiments 1–2 of the invention in which the differences in the film thickness (steps) were not greater than 0.5 $\mu$m, the joint portions became unconfirmable unless carefully observed, so that printing quality was substantially equal to that of the film photo.

In the samples of Comparative Examples 3–4 in which differences in the film thickness (steps) of the ink receiving layers 13 exceeded 1.0 μm, on the contrary, the joint portions became readily confirmable without being observed carefully.

What is claimed is:

1. An optical recording medium comprising:
    a disc body, an ink receiving layer provided on the label side of the disc body; and
    an undercoat layer provided between the label side of the disc body and the ink receiving layer,
    wherein the mean roughness (Ra) of the surface of the undercoat layer is not greater than 0.2 μm.

2. An optical recording medium as claimed in claim 1, wherein the mean roughness (Ra) of the surface of the undercoat layer is not greater than 0.1 μm.

3. An optical recording medium as claimed in either claim 1 or claim 2, wherein the undercoat layer includes at least a white ink layer.

4. A method of producing an optical recording medium, comprising:
    a first step of forming an undercoat layer by a screen printing method on the label side of a disc body so that the mean roughness (Ra) of the surface of the undercoat layer is not greater than 0.2 μm; and
    a second step of forming an ink receiving layer on the undercoat layer by a spin coating method or a slit coating method.

5. A method of producing optical recording medium, comprising:
    a first step of forming an uncured undercoat layer containing ultraviolet-curable resin by a screen printing method on the label side of a disc body;
    a second step of curing the uncured undercoat layer by irradiating the undercoat layer with ultraviolet rays; and
    a third step of forming an ink receiving layer on the cured undercoat layer by a spin coating method or a slit coating method,
    wherein a duration of time required until the second step is taken after the completion of the first step is set longer than the time required to make the mean roughness (Ra) of the surface of the uncured undercoat layer not greater than 0.2 μm after the completion of the first step.

6. An optical recording medium comprising:
    a disc-shaped body; and
    at least an ink receiving layer which is provided on the label side of the disc body and has a difference in level radially extended,
    wherein the difference is not greater than 1.0 μm.

7. An optical recording medium as claimed in claim 6, wherein the difference is not greater than 0.5 μm.

8. An optical recording medium as claimed in either claim 6 or claim 7, wherein an undercoat layer is further provided between the label side of the disc body and the ink receiving layer.

9. A method of producing an optical recording medium, comprising:
    a first step of forming a coating film by a slit coating method on the label side of a disc-shaped body; and
    a second step of forming an ink receiving layer by drying the coating film,
    wherein a step that is a difference in level produced at a joint portion where a liquid-application starting area and a liquid-application terminating area by using the slit coating method overlap each other is set not greater than 1.0 μm after the completion of the second step.

10. A method of producing an optical recording medium, comprising:
    a first step of forming a coating film on the label side of a disc-shaped body by rotationally moving the positional relation between a head having a slit for supplying an application liquid and the disc body;
    a second step of making a step have a gentle slop by turning the disc body in a joint portion where a liquid-application starting area and a liquid-application terminating area; and
    a third step of forming an ink receiving layer by drying the coating film.

11. A method of producing an optical recording medium as claimed in claim 10, wherein the rotational time at the second step is set longer than the time required to make the step not greater than 0.1 μm after the completion of the third step.

* * * * *